(12) United States Patent
Bukhari et al.

(10) Patent No.: US 7,900,748 B2
(45) Date of Patent: Mar. 8, 2011

(54) LUBRICATION SYSTEM FOR A HYDRAULIC OR PNEUMATIC TOOL

(75) Inventors: Raza Bukhari, Middlesex (GB);
Lauritz Phillip Pillers, Shorewood, IL (US)

(73) Assignee: Caterpillar Inc, Peoria, IL (US)

( * ) Notice: Subject to any disclaimer, the term of this patent is extended or adjusted under 35 U.S.C. 154(b) by 860 days.

(21) Appl. No.: 11/408,050

(22) Filed: Apr. 21, 2006

(65) Prior Publication Data

US 2006/0243528 A1 Nov. 2, 2006

(30) Foreign Application Priority Data

Apr. 27, 2005 (EP) .................................. 05252640

(51) Int. Cl.
*B23Q 11/12* (2006.01)
*B25D 17/26* (2006.01)
(52) U.S. Cl. .......................... 184/6.14; 184/29
(58) Field of Classification Search .................. 184/42, 184/39, 29, 32, 34, 6.14; 173/90, 197, 58, 173/59; 137/509; 222/256, 262; 417/383, 417/386
See application file for complete search history.

(56) References Cited

U.S. PATENT DOCUMENTS

| | | |
|---|---|---|
| 1,629,730 A | 5/1927 | Penberthy |
| 1,849,819 A | 2/1932 | Smith, Jr. |
| 1,971,772 A | 8/1934 | Curtis |
| 1,968,901 A | 10/1934 | Nell |
| 2,827,860 A | 3/1958 | Roberts |
| 2,869,374 A | 1/1959 | Morris |
| 3,129,788 A | 4/1964 | Heckt |
| 3,193,028 A | 7/1965 | Radizimovsky |
| 3,487,892 A | 1/1970 | Kiefer |
| 3,490,549 A | 1/1970 | Catterson |
| 3,587,782 A | 6/1971 | Russell et al. |
| 3,595,342 A | 7/1971 | O'Leary |
| 3,661,216 A | 5/1972 | Yamanaka |
| 3,664,462 A | 5/1972 | Smith, Sr. |
| 3,749,186 A | 7/1973 | Kutuzov et al. |
| 3,774,700 A | 11/1973 | Shepherd |
| 3,966,019 A | 6/1976 | Heikkila et al. |
| 4,149,602 A | 4/1979 | James |
| 4,157,121 A | 6/1979 | Amtsberg et al. |
| 4,190,116 A | 2/1980 | O'Neal et al. |
| 4,289,209 A | 9/1981 | Salmi |
| 4,333,538 A | 6/1982 | Ekwall |
| 4,474,248 A | 10/1984 | Musso |
| 4,598,796 A * | 7/1986 | Barrows ........................ 184/42 |
| 4,793,719 A | 12/1988 | Crockett et al. |
| 5,060,761 A | 10/1991 | Arndt |
| 5,293,959 A | 3/1994 | Kimberlin |

(Continued)

FOREIGN PATENT DOCUMENTS

EP 0486752 4/1991

(Continued)

*Primary Examiner* — Robert A Siconolfi
*Assistant Examiner* — Vu Q Nguyen
(74) *Attorney, Agent, or Firm* — Finnegan, Henderson, Farabow, Garrett & Dunner LLP (57) ABSTRACT

A lubrication system for a hydraulic or pneumatic tool is described. The lubrication system includes a valve, a lubricant pumping mechanism and a lubricant storage chamber, the valve being adapted to move between a tool-deactivated position and a tool-activated position to cause the lubricant pumping mechanism to displace lubricant from the lubricant storage chamber. A method of distributing lubricant to a hydraulic or pneumatic tool is also described.

20 Claims, 8 Drawing Sheets

| U.S. PATENT DOCUMENTS | | | |
|---|---|---|---|
| 5,351,763 A | 10/1994 | Muuttonen | |
| 5,385,209 A | 1/1995 | Bodell et al. | |
| 5,549,031 A | 8/1996 | Giordano | |
| 5,562,170 A | 10/1996 | Wolfer et al. | |
| 5,653,295 A * | 8/1997 | Juvonen et al. | 173/208 |
| 6,070,678 A | 6/2000 | Pascale | |
| 6,116,301 A | 9/2000 | Deimel et al. | |
| 6,145,625 A | 11/2000 | Prokop et al. | |
| 6,273,199 B1 | 8/2001 | Kiikka et al. | |
| 6,405,810 B1 | 6/2002 | Grach et al. | |
| 6,510,904 B1 | 1/2003 | Tyrrell | |
| 6,631,787 B2 | 10/2003 | Conley et al. | |
| 2006/0048957 A1 | 3/2006 | Oksman | |

| FOREIGN PATENT DOCUMENTS | | |
|---|---|---|
| EP | 0 935 090 B1 | 8/1999 |
| EP | 1 112 820 A2 | 7/2001 |
| EP | 1 321 245 A1 | 6/2003 |
| EP | 1321245 | 6/2003 |
| EP | 1321245 A1 * | 6/2003 |
| JP | 57-190894 | 11/1982 |
| WO | WO 02/33309 | 4/2002 |
| WO | 03/053639 | 7/2003 |

* cited by examiner

LUBRICATION SYSTEM FOR A HYDRAULIC OR PNEUMATIC TOOL

TECHNICAL FIELD

This disclosure relates to a lubrication system for a hydraulic or pneumatic tool, and more particularly to a lubrication system for a hydraulic hammer. This disclosure also relates to a method of distributing lubricant to a hydraulic or pneumatic tool.

BACKGROUND

Hydraulic hammers and pneumatic hammers are used on work sites to break up large hard objects before such objects can be moved away. The hammers may be mounted to back hoes or excavators, or may be hand-held. Typically, the hammer assembly may be powered by either a hydraulic or pneumatic pressure source. During a work or power stroke, a drive fluid at high pressure may be applied to a first shoulder of a piston, thereby driving the piston in a forward direction. The piston then may strike a tool bit, which may be driven in the forward direction thereby causing a work tip of the tool bit to strike the rock, concrete, asphalt or other hard object to be broken up.

During a return stroke, fluid pressure may be applied to a second shoulder of the piston in order to return the piston to its original position. It is desirable to provide lubrication to the bearing surfaces of the hammer at intervals during operation of the hammer.

It is known to incorporate a lubrication system that is separate from the hammer, for example by being mounted on a carrier machine. In such machine-mounted systems, the lubrication system does not move with the hammer when the hammer is removed from the machine for use on another carrier machine.

Alternatively, it is known to mount a lubrication system externally on the hammer, i.e. an on-board system. On-board systems may need external hoses and other external components that are exposed to damage during use of the hammer.

It is an object of the present disclosed embodiments to overcome one or more of the above disadvantages.

SUMMARY OF THE INVENTION

In accordance with a first aspect of a disclosed embodiment there is provided a lubrication system for a hydraulic or pneumatic tool that comprises a valve spool adapted to move between a tool-deactivated position in which a fluid path for flow of drive fluid to the tool is closed and a tool-activated position in which the fluid path is open. A lubricant storage chamber is provided. A lubricant pumping mechanism is operable by movement of the valve spool between the tool-activated position and the tool-deactivated position to displace lubricant from the lubricant storage chamber.

In accordance with a second aspect of a disclosed embodiment, there is provided a method of distributing lubricant to a hydraulic or pneumatic tool having a bearing surface. The method may comprise moving a valve spool of a valve between an open position in which drive fluid is provided to the tool and a closed position in which drive fluid is not provided to the tool. Moving the valve spool between the open and closed positions may comprise displacing lubricant from a lubricant storage chamber to the bearing surface of the tool.

DETAILED DESCRIPTION

Figure 1:
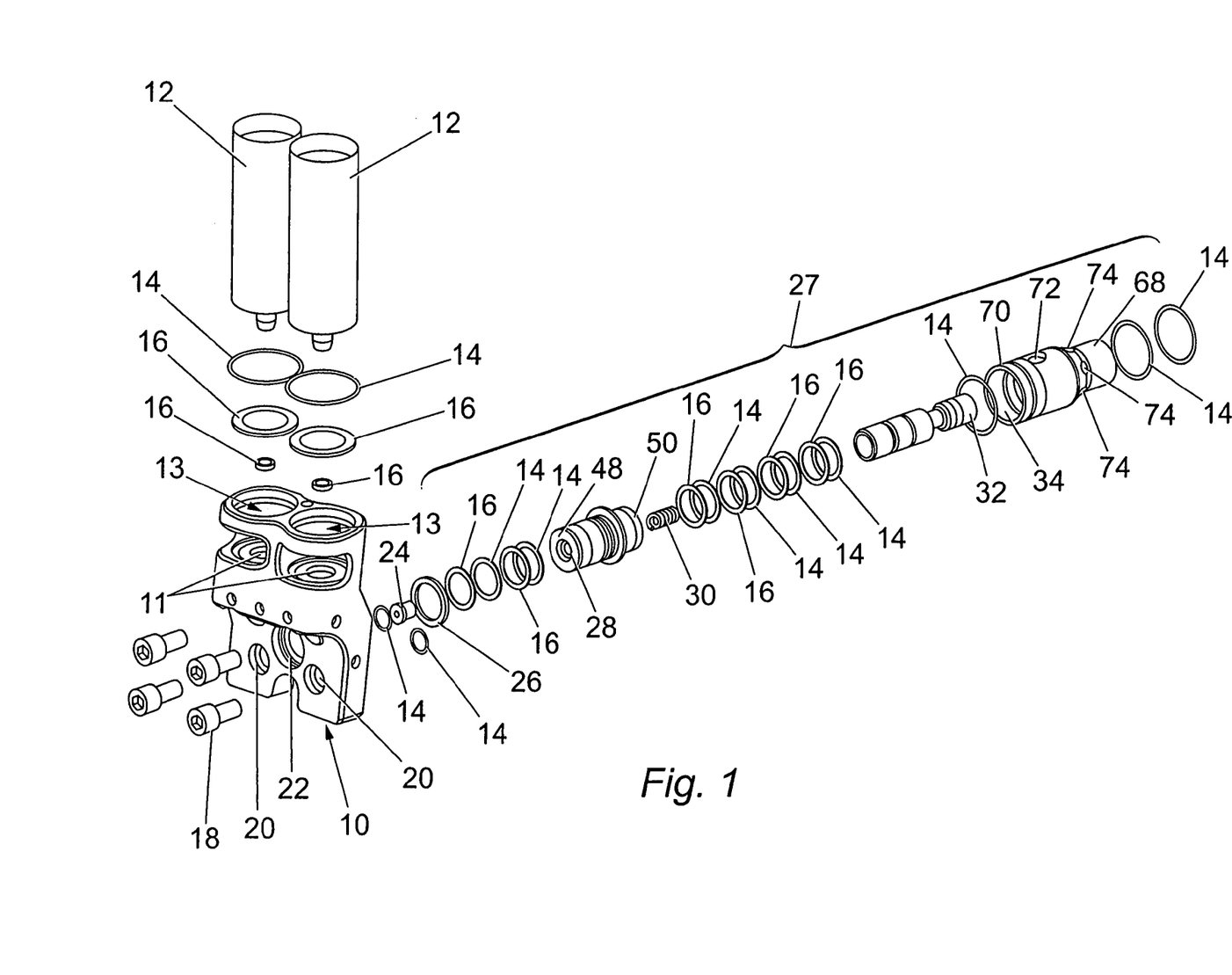
FIG. 1 is an exploded view of a hammer lubrication system according to a disclosed embodiment.
Figure 2:
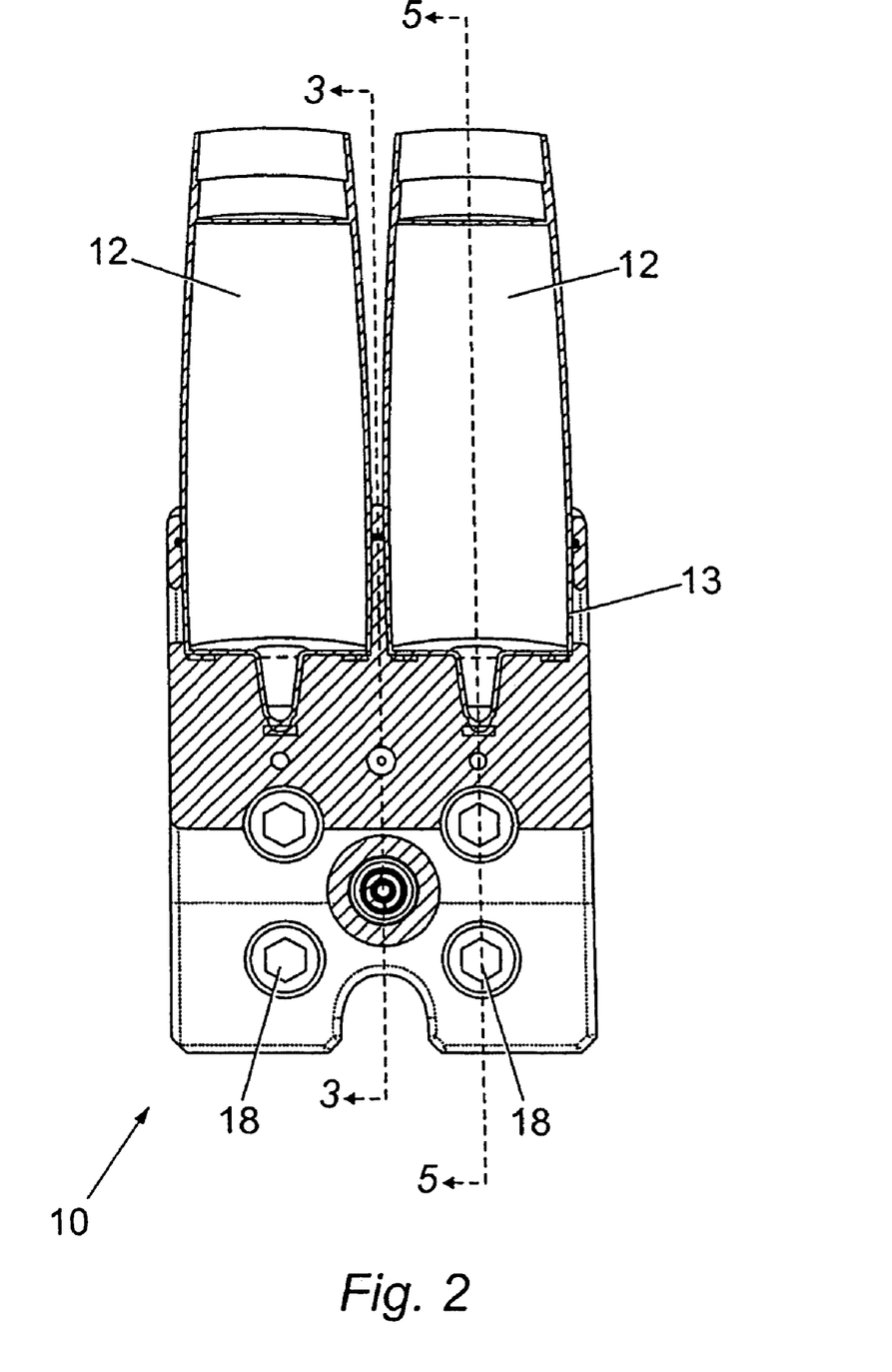
FIG. 2 is a cross-sectional view of the hammer lubrication system of FIG. 1, taken along the line 2-2 of FIG. 3.
Figure 3:
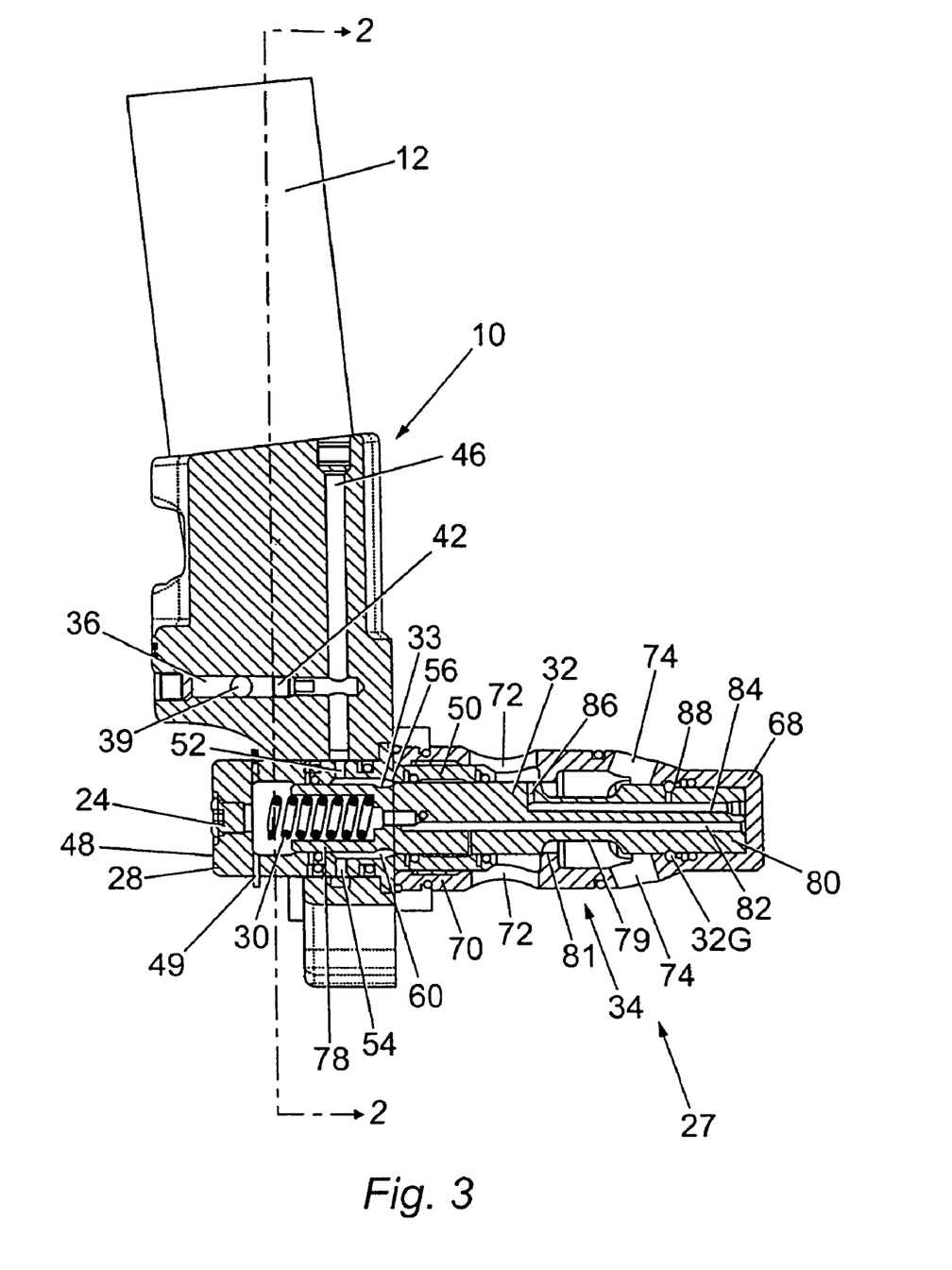
FIG. 3 is a cross-sectional view of the hammer lubrication system of FIG. 1, taken along the line 3-3 of FIG. 2.

Referring now to FIGS. 1 to 3, by way of example only, there is shown a hydraulic hammer lubrication system. The hammer lubrication system includes a housing 10 and two grease cartridges 12. The housing 10 has two cartridge supporting recesses 13 in its upper surface, in which the grease cartridges 12 are received. The cartridge supporting recesses 13 also provide seats for various o-ring seals 14 and seals 16, which prevent grease from the cartridges 12 from leaking out of the top of the cartridge supporting recesses 13. Although this disclosure identifies grease as a lubricant, any suitable lubricant may be used.

Windows 11 are formed in the walls of the cartridge supporting recesses 13, to allow the cartridges 12 to be visible through the housing 10, enabling a visual assessment of remaining lubricant. The cartridge plungers may be coloured to assist visibility.

The lower portion of the housing 10 has four apertures 20 which receive bolts 18 to attach the housing 10 to a hydraulic hammer 92. The apertures 20 extend between the front and the rear of the housing 10. Between these four apertures 20 is a central aperture 22 that receives a valve assembly 27.

In the illustrated example, the valve assembly 27 comprises three main components: a cap sleeve 28, a sleeve 34 and a spool 32. The cap sleeve 28 and the sleeve 34 are both hollow and substantially cylindrical. An open end 70 of the sleeve 34 fits over an open end 50 of the cap sleeve 28 to define a hollow chamber in which the spool 32 is located. The opposite end 48 of the cap sleeve 28 is closed by a plug 24, and the opposite end 68 of the sleeve 34 is closed by an end wall.

The spool 32 is shorter than the length of the hollow chamber, so that the spool 32 can move between a "closed" position where the spool 32 abuts the closed end 68 of the sleeve 34 and an "open" position where the spool 32 abuts the closed end 48 of the cap sleeve 28. The "closed" position is a tool-deactivated position in which drive fluid, which in this embodiment comprises hydraulic fluid, cannot flow to the tool, while the "open" position is a tool-activated position in which hydraulic fluid can flow to the tool.

The spool 32 has a first end 78 that has a recess in which a spring 30 is received. The spring 30 extends between the first end 78 of the spool 32 and the closed end 48 of the cap sleeve 28 and urges the spool 32 against the closed end 68 of the sleeve 34; i.e. the "closed" position.

The cap sleeve 28 has a flange 56 extending radially outwards at a location approximately halfway along its length. The closed end 48 of the cap sleeve 28 is received within the central aperture 22 of the housing 10, and the flange 56 is received within a recess in the rear wall of the housing 10.

The cap sleeve 28 has a grease inlet passage 52 provided in its side wall between the flange 56 and the closed end 48. When the cap sleeve 28 is received within the central aperture 22, the grease inlet passage 52 aligns with a longitudinal passage 46 in the housing, which will be described in more detail below. Two sets of seals 14, 16 are provided in the outer surface of the cap sleeve 28, one set of seals 14, 16 on either side of the grease inlet passage 52.

The grease inlet passage 52 leads to a portion of the bore of the cap sleeve 28 having an increased inner diameter, which, together with the outer surface of the spool 32, defines a lubricant storage chamber in the form of a grease charge chamber 60. The length of the grease charge chamber 60 is greater than the range of movement of the spool 32 within the bores of the cap sleeve 28 and the sleeve 34.

The spool 32 is provided with a groove 33 in its outer wall surface, the location of which is selected so that at either of the extreme positions of the spool 32 within the cap sleeve 28 and the sleeve 34, the groove 33 always lies within the grease charge chamber 60.

To the side of the groove 33 closest to the first end 78 of the spool 32, the diameter of the spool 32 is less than the diameter of the spool on the other side of the groove 33. The bore of the cap sleeve 28 also has a varying inner diameter to accommodate the different diameter portions of the spool 32.

The part of the bore of the cap sleeve 28 between the grease charge chamber 60 and the closed end 48 has a diameter substantially equal to the outer diameter of the spool 32 at the first end 78 of the spool 32. Hence, the portion of the spool 32 between the groove 33 and the first end 78 of the spool 32 acts as a piston 32A and the part of the bore of the cap sleeve 28 which surrounds the first end 78 of the spool 32 acts as a cylinder 28A in which the piston moves.

The bore of the cap sleeve 28 on the other side of the grease charge chamber 60 has a larger inner diameter that is substantially equal to the outer diameter of the spool 32 at a middle portion of the spool 32 (the portion on the other side of the groove 33). Hence, this part of the bore of the cap sleeve 28 acts as a further cylinder 28B, in which a piston 32B formed by the middle portion of the spool 32 moves.

Therefore, depending on the position of the spool 32 within the cap sleeve 28, the volume of the grease charge chamber 60 will vary. Reciprocal motion of the pistons 32A, 32B in the cylinders 28A, 28B acts as a lubricant pumping mechanism causing grease to be drawn into the grease charge chamber 60 or to be pushed out from the grease charge chamber 60.

The cap sleeve 28 has three annular seal-receiving portions along the inner side of its bore, each seal-receiving portion being adapted to accommodate an o-ring seal 14 and a seal 16. A pair of seals 14, 16 is provided on each side of the grease charge chamber 60, so that grease cannot leak longitudinally along the edge of the spool 32 beyond the seals 14, 16. The third pair of seals 14, 16 is located near the open end 50 of the cap sleeve 28.

Inside the spool 32 is a longitudinal air bore 82 which connects the first 78 end of the spool 32 with an opening in the second end 80 of the spool 32. The cap sleeve 28 has two air venting channels 49 which are located in the side wall near the closed end 48 and which communicate with the inner bore of the cap sleeve 28. An annular groove is provided at the same longitudinal location; the annular groove receives an o-ring 26. The second end 80 of the spool 32, the air bore 82, and the bore around the first end 78 of the spool 32 are all at atmospheric pressure, due to the air venting passages 49.

The air bore 82 is slightly offset from the center of the spool 32, to allow room for a further longitudinal passage: a hydraulic fluid bore 84. The hydraulic fluid bore 84 extends from the second end 80 of the spool 32 approximately half way along the length of the spool 32. The end of the hydraulic fluid bore 84 is plugged.

The hydraulic fluid bore 84 has a hydraulic fluid inlet channel 86 and a hydraulic fluid outlet channel 88, which are lateral passages that connect the hydraulic fluid bore 84 with the outside of the spool 32.

The wall of the sleeve 34 has two hydraulic fluid inlet apertures 72, and longitudinally spaced apart from the inlet apertures 72, four hydraulic fluid outlet apertures 74. The inlet and outlet apertures 72, 74 are evenly spaced around the circumference of the sleeve 34.

The respective longitudinal locations of the hydraulic fluid inlet apertures 72 and the hydraulic fluid inlet channel 86 are selected so that when the spool 32 is in both the open and closed positions, these are aligned and communication therebetween is possible.

The spool 32 has a reduced diameter portion 79, which, when the spool 32 is in the open position (see FIG. 9), is aligned with both the hydraulic fluid inlet apertures 72 and a reduced diameter portion 81 of the sleeve 34, to allow fluid communication directly between the hydraulic fluid inlet apertures 72 and the hydraulic fluid outlet apertures 74 via the inside of the sleeve 34.

However, in the closed position (see FIG. 8), the reduced diameter portion 79 of the spool 32 is not aligned with the hydraulic fluid inlet apertures 72. The non-reduced diameter side wall of the spool 32 meets the reduced diameter portion 81 of the sleeve 34, which prevents fluid communication directly between the hydraulic fluid inlet apertures 72 and the hydraulic fluid outlet apertures 74 via the inside of the sleeve 34.

A pair of seals 14 is located in a groove in the side wall of the sleeve 34 near to the closed end 68. The location of the hydraulic fluid outlet channel 88 is selected so that at both extreme positions of the spool 32, the seals 14 are located between the end 80 of the spool 32 and the hydraulic fluid outlet channel 88 so that no hydraulic fluid can pass the seals 14 to reach the second end 80 of the spool 32.

An annular groove 32G is provided around the outside of the spool 32 at the hydraulic fluid outlet channel 88 so that hydraulic fluid from the outlet channel 88 can be distributed around the annular groove 32G. The diameter of the spool 32 on the side of the groove 32G closest to the second end 80 of the spool 32 is smaller than the diameter of the spool 32 on the other side of the groove 32G. Therefore, the surface area of the wall of the groove 32G furthest from the second end 80 of the spool 32 is larger than the opposite wall. Hence, when pressure builds up in the groove 32G, the pressure upon the larger wall causes a larger force than the pressure upon the smaller wall. Therefore, on application of pressurised fluid to the groove 32G, the spool 32 is urged to the left in FIG. 8, away from the closed end 68 of the sleeve 34.

FIGS. 4 to 7 and 11 show the housing 10 in more detail. Extending from the front of the housing 10 and parallel to the apertures 20, 22, are a central passage 36 and two outer passages 38 on either side of the central passage 36. A transverse passage 39 extends from one of the sides of the housing and connects the central passage 36 and the outer passages 38.

The cartridge supporting recesses 13 feed into the outer passages 38 (see particularly FIG. 5) so that grease from cartridges 12 located in the recesses 13 can feed into the outer passages 38.

A longitudinal passage 46 extends between an upper surface of the housing 10 and the central aperture 22, intersecting the central passage 36, thereby connecting the central passage 36 to the central aperture 22.

A respective lateral passage 62 extends from either side of the housing 10 and connects to the central aperture 22. Respective longitudinal passages 64 are connected to the lateral passages 62 and lead to outlets 66 in the rear of the housing 10. Thus, the lateral passages 62 and the longitudinal passages 64 connect the central aperture 22 to outlets 66.

Figure 4:
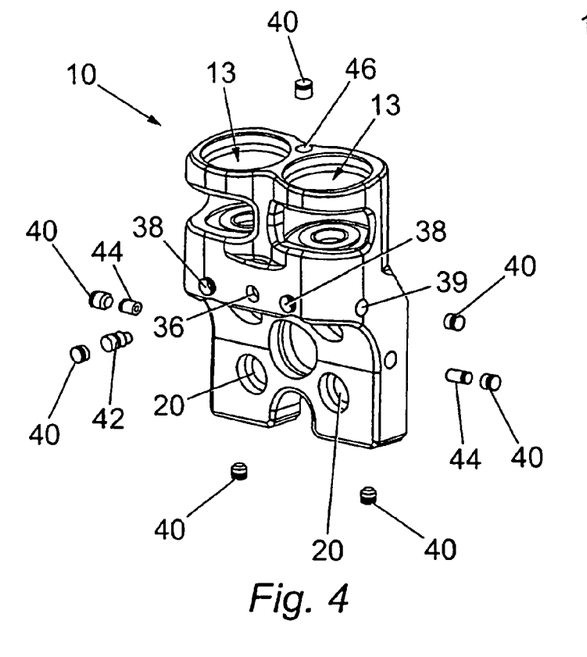
FIG. 4 is a perspective view of a housing of the hammer lubrication system of FIG. 1.
Figure 5:
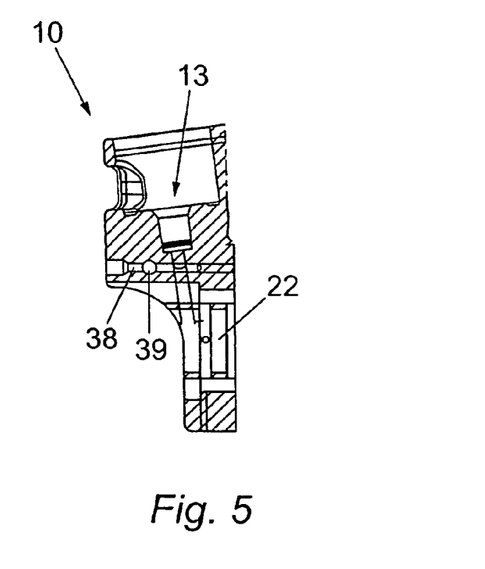
FIG. 5 is a cross-sectional view taken along the line 5-5 of FIG. 2 excluding the grease cartridge.
Figure 6:
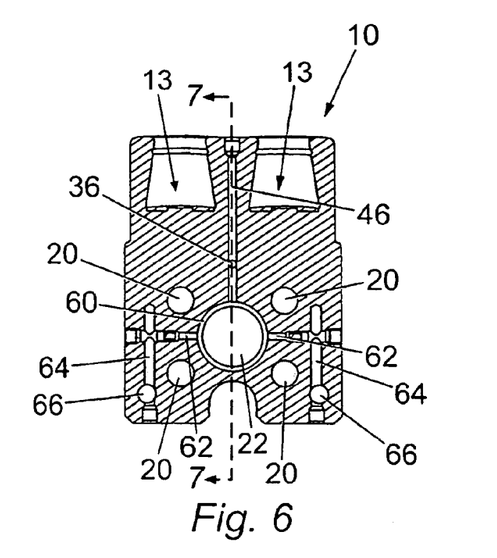
FIG. 6 is a further cross-sectional view of the housing of FIG. 4.
Figure 7:
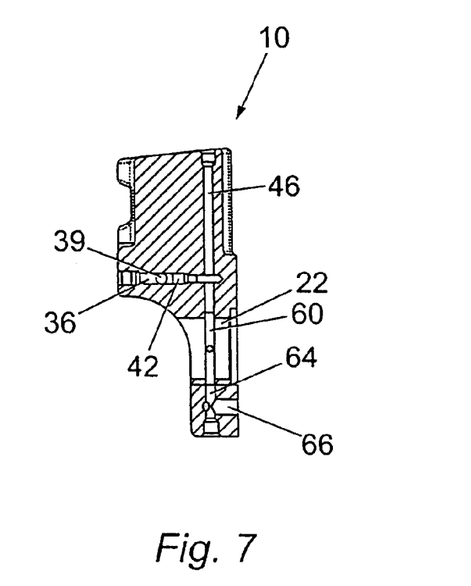
FIG. 7 is a cross-sectional view of the housing of FIG. 6, taken along the line 7-7 of FIG. 6.
Figure 11:
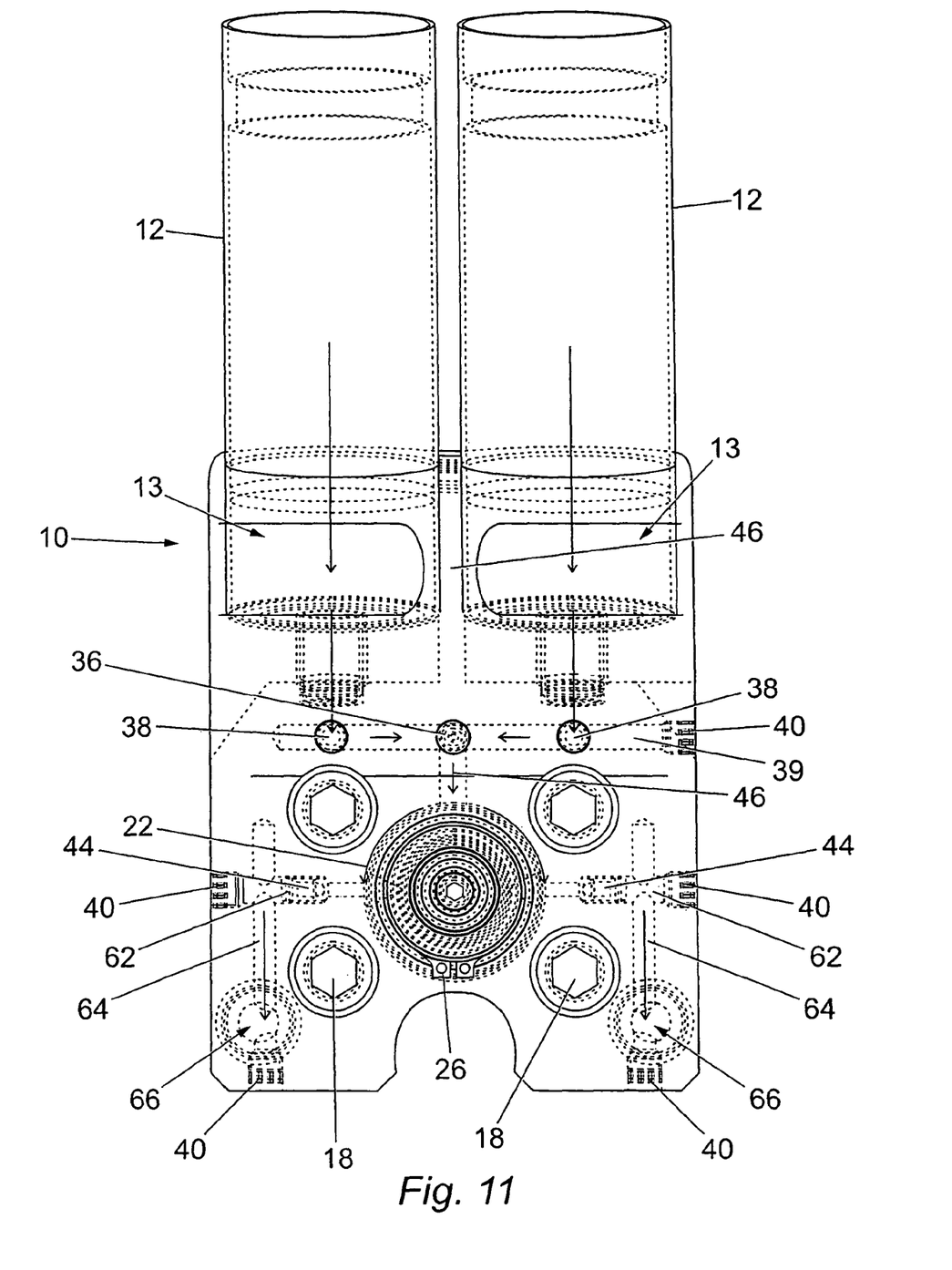
FIG. 11 is a front view of the lubrication system of FIG. 1, showing internal detail.

The central passage 36, the outer passages 38, the transverse passage 39, the lateral passages 62 and the longitudinal passage 46 all have ends which terminate in the outside of the housing 10; these ends are plugged by plugs 40 (see FIGS. 4 and 11).

Reverse flow check valves 44 are located in the lateral passages 62 between the central aperture 22 and the junction with the longitudinal passages 64. The reverse flow check valves 44 prevent any flow in the direction of the central aperture 22. A forward flow check valve 42 is provided in the central passage 36 between its junction with the transverse passage 39 and the longitudinal passage 46. The forward flow check valve 42 prevents any flow towards the transverse passage 39.

INDUSTRIAL APPLICABILITY

Figure 8:
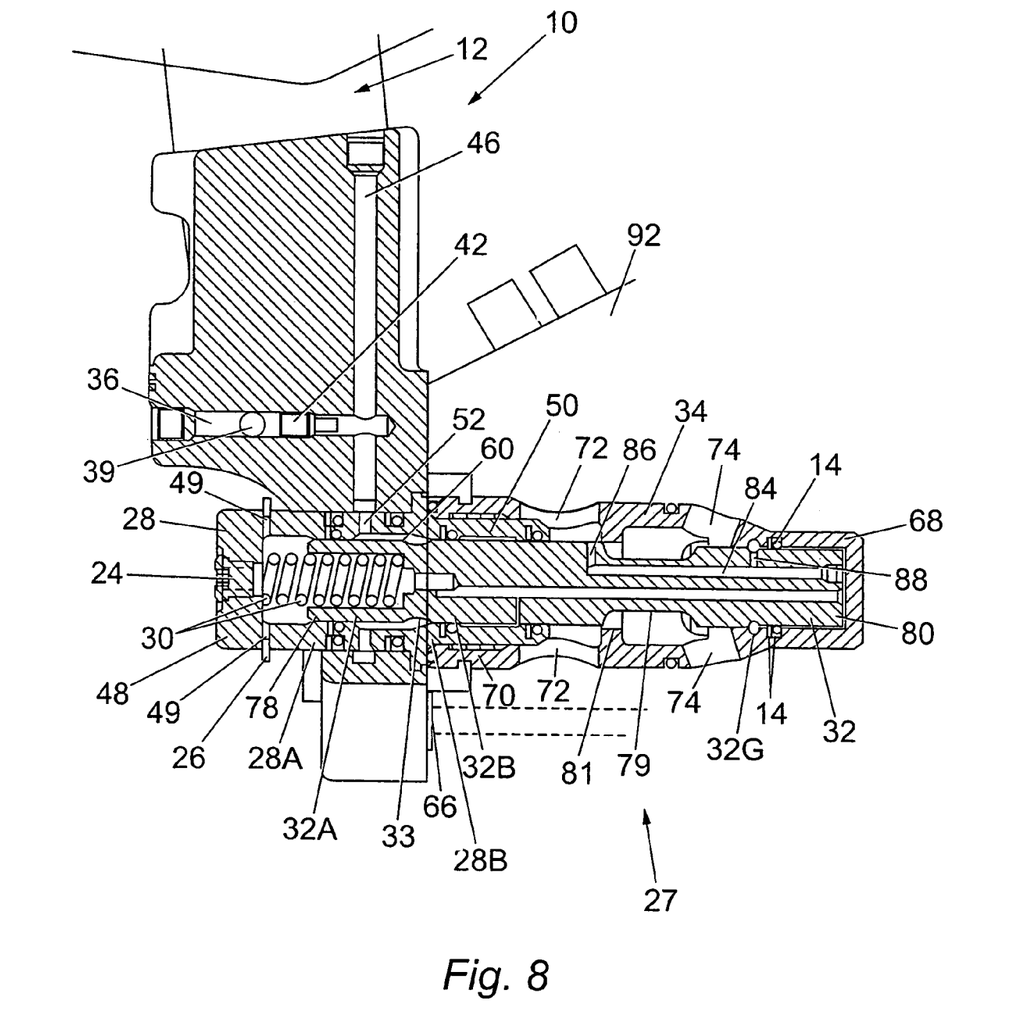
FIG. 8 is an enlarged view of part of FIG. 3, showing the lubrication system in an initial position.

In use, the hammer lubrication system is bolted to a hydraulic hammer 92, as shown in FIG. 8. The hydraulic fluid supply to the hammer 92 is connected to the hydraulic fluid inlet apertures 72 so that the hydraulic fluid is diverted through the hammer lubrication system before being then diverted back to the hammer via hydraulic fluid outlet apertures 74. From the outlet apertures 74, the hydraulic fluid is applied to a first shoulder of a piston of the hammer; hence the hydraulic fluid is a "drive" fluid as it drives the piston of the hammer. Hence, the lubricant is provided to the lubrication points through pre-existing grease ports/channels in the hammer. Therefore, at least some embodiments of the invention can be used with existing hammers without modification to the hammers.

Grease is located in the grease charge chamber 60.

In this embodiment, the lubrication system is mounted directly on a hammer rather than on a carrier machine, so the lubrication system travels with the hammer even if the hammer is moved from the machine.

Before the hammer is activated, the spool is in the tool-deactivated position shown in FIG. 8, with the spring 30 urging the spool 32 against the closed end 68 of the sleeve 34.

When the hammer is activated, hydraulic fluid at a pressure P1 is supplied to the hydraulic fluid inlet apertures 72. The hydraulic fluid passes through the hydraulic fluid inlet channel 86, the hydraulic fluid bore 84 and the hydraulic fluid outlet channel 88, and spreads around the annular groove 32G. As the fluid cannot travel any further towards the end 80 of the spool 32, due to the seals 14, pressure builds up in the annular groove 32G.

As explained above, the side walls of the groove 32G have different areas, which causes a differential force. Since the wall closest to the second end 80 has the smaller area, the spool 32 is pushed less towards the closed end 68 of the sleeve 34 than away from the closed end 68. Hence, the pressure urges the spool 32 away from the closed end 68, to the left in FIG. 8.

Figure 9:
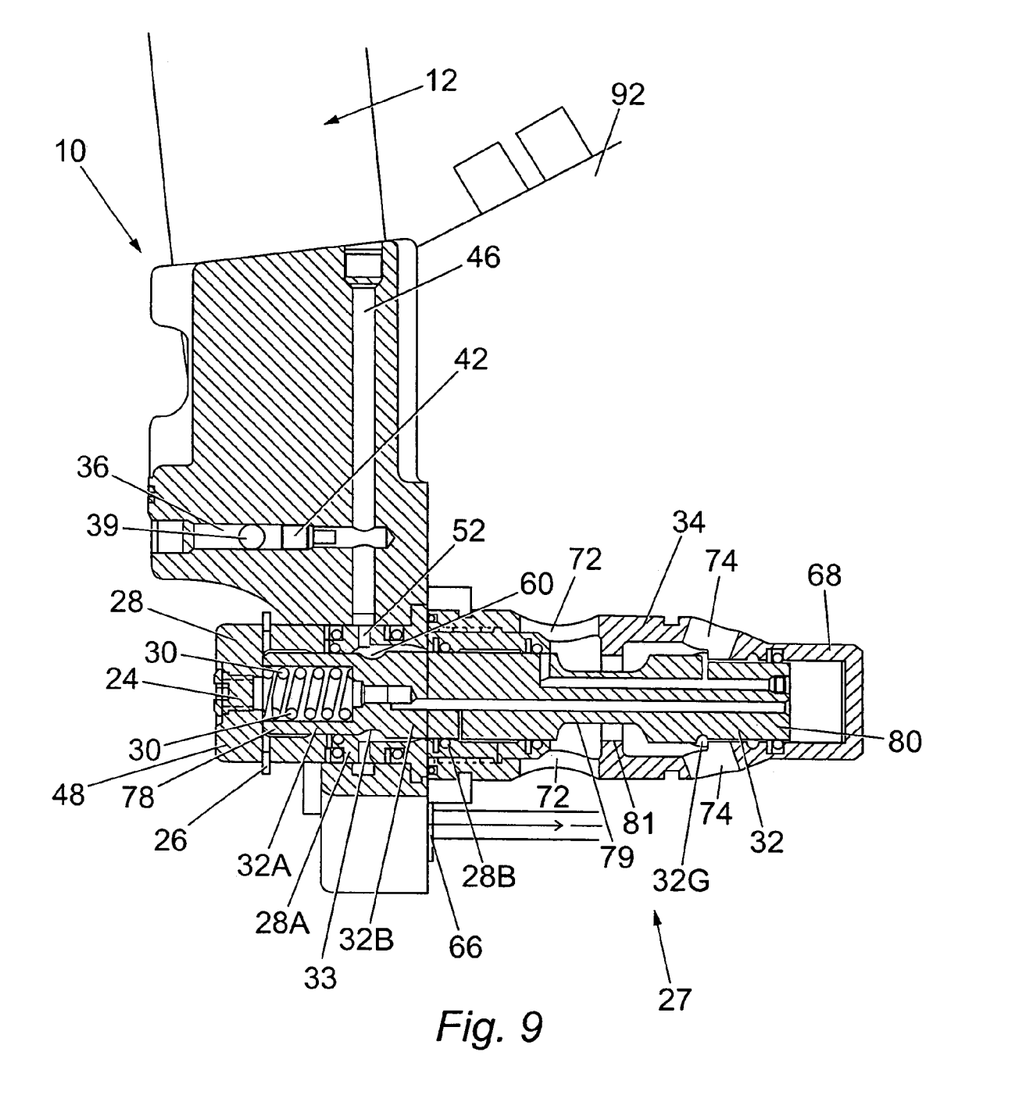
FIG. 9 is a view similar to that of FIG. 8, showing the lubrication system in a mid-stroke position.

When the pressure builds up beyond a threshold value P2 (where P1>P2), this overcomes the stiffness of the spring 30, and the spool 32 moves towards the closed end 48 of the cap sleeve 28 to the tool-activated position shown in FIG. 9.

This causes the smaller diameter piston 32A on the side of the groove 33 closest to the first end 78 of the spool 32 to move out of the grease charge chamber 60, whilst the larger diameter piston 32B on the opposite side of the groove 33 moves into the grease charge chamber 60. This reduces the overall volume of the grease charge chamber 60.

Since the grease cannot flow back through the grease inlet passage 52 because of the plugged end of the longitudinal passage 46 and the forward flow check valve 42, some of the grease from the grease charge chamber 60 is forced through the lateral passages 62, through the longitudinal passages 64, and out of the grease outlets 66, from where the grease is directed to the bearing lubrication points on the hammer 92.

Figure 10:
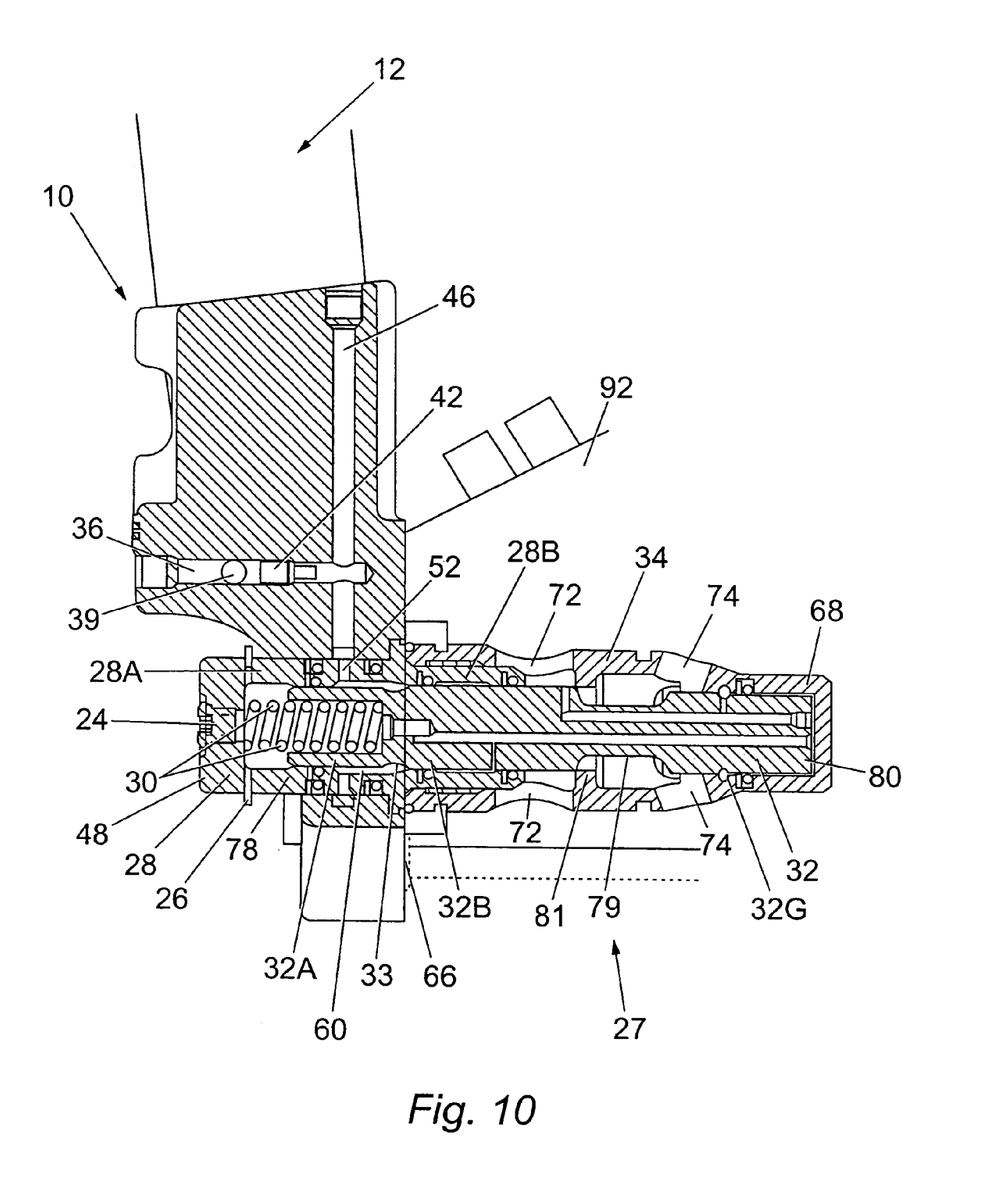
FIG. 10 is a further view of the lubrication system of FIG. 8, showing the lubrication system in an end-stroke position.

When the hammer is deactivated, the hydraulic pressure decays. When the hydraulic pressure decays to the threshold value P2 (where P1>P2), the force of the spring 30 is stronger than the hydraulic force, so the spring 30 urges the spool 32 against the closed end 68 of the sleeve 34, as shown in FIG. 10.

Since the hydraulic pressure required to overcome the spring 30 is substantially less than the normal operating pressure of the hammer 92, the valve assembly 27 will remain in the open position during relatively small fluctuations in the hydraulic pressure.

The movement of the spool 32 brings the smaller diameter piston 32A of the spool 32 on the side of the groove 33 closest to first end 78 of the spool 32 back into the grease charge chamber 60, increasing the volume of the grease charge chamber 60.

Since the reverse flow check valves 44 prevent any backflow from the outlets 66 to the grease charge chamber 60, the increase in volume of the grease charge chamber 60 produces a suction force which pulls in new grease to the grease charge chamber 60 from the cartridges 12, via the outer passages 38, the transverse passage 39, the central passage 36, the valve 42 and the longitudinal passage 46. The lubricant is drawn in a generally uniform manner from the cartridges 12. This replenishes the grease charge chamber 60, so that when the hammer 92 is next activated, the process can begin again. Thus, the hammer is lubricated upon each hammer activation. Therefore, correct lubrication is automatically ensured.

In this embodiment, no external hoses or other components are required. This reduces the risk of damage to the lubrication system during use of the hammer. Therefore, this embodiment provides a practical and robust design of hammer lubrication system.

This embodiment uses the surfaces of the spool 32 and the cap sleeve 28 to act as pumping elements, both to pump grease to the hammer during activation of the hammer and to draw new grease into the grease charge chamber 60 during deactivation of the hammer. Therefore, no additional pump is required. The pumping action is activated by the hydraulic fluid pressure, so no additional pumping power supply is needed.

This embodiment uses a dual tube lubricant supply (the two cartridges 12), which extends the time between replacement of the cartridges 12. The lubricant is pumped to the lubrication points by a single pumping mechanism rather than having a separate pumping mechanism for each cartridge, thus ensuring a reliable operation and minimising the number of components needed. In alternative embodiments, one or more than two cartridges 12 could be provided.

While the disclosed embodiments have been illustrated and described in detail in the drawings and foregoing description, such illustration and description is to be considered as exemplary and not restrictive in character, it being understood that only certain exemplary embodiments have been shown and described and that all changes and modifications that come within the scope of the disclosure are desired to be protected. For example, in alternative embodiments, the bearing surfaces of the hammer may be lubricated upon deactivation of the hammer, instead of upon activation. In such embodiments, the grease charge chamber may be replenished whilst the hammer is being activated, instead of upon deactivation.

In some embodiments, the spool 32 is a single component. When the spool 32 moves, it not only prevents or allows hydraulic pressure to flow to the hammer, but it also pumps the grease to/from the grease charge chamber. However, in alternative embodiments, the spool 32 could comprise two or more separate components which are coupled for movement together. The lubricant pumping mechanism could comprise a different arrangement of pistons 32A, 32B and cylinders 28A, 28B, for example a single piston and cylinder.

The disclosed embodiments are not limited to use with hydraulic hammers. Rather, they may be used with any hydraulic or pneumatic work tool where lubrication of a bearing surface is desired. In addition, other configurations of valve assembly 27 are possible.

The invention claimed is:

1. A lubrication system comprising:
a sleeve defining at least one fluid inlet aperture in fluid communication with a fluid source for receiving a fluid from the fluid source and at least one fluid outlet aperture configured to be in fluid communication with a tool for delivering the fluid to the tool;
a valve spool at least partially positioned within the sleeve and adapted to move between a first position in which a fluid path for flow of the fluid between the fluid inlet aperture and the fluid outlet aperture is blocked by the valve spool and therefore closed, and a second position in which the fluid path between the fluid inlet aperture and the fluid outlet aperture is open and permits the fluid to flow from the fluid inlet aperture to the fluid outlet aperture;
a lubricant charge chamber; and
a portion of the valve spool forms a lubricant pumping mechanism operable by movement of the valve spool between the second position and the first position to displace a lubricant from the lubricant charge chamber, and the valve spool maintains the fluid separate from the lubricant to prevent contamination of each.

2. A lubrication system as claimed in claim 1, wherein the lubricant pumping mechanism is operable by movement of the valve spool from the first position to the second position to displace lubricant from the lubricant charge chamber.

3. A lubrication system as claimed in claim 1, wherein the lubricant pumping mechanism is operable by movement of the valve spool between the second position and the first position to cause further lubricant to be drawn into the lubricant charge chamber.

4. A lubrication system as claimed in claim 1, wherein the lubricant pumping mechanism comprises a piston and a cylinder, and wherein movement of the piston relative to the cylinder changes the volume of the lubricant charge chamber to displace the lubricant.

5. A lubrication system as claimed in claim 4, wherein the piston of the lubricant pumping mechanism is coupled for movement with the valve spool.

6. A lubrication system as claimed in claim 1, wherein the valve spool is biased towards the first position.

7. A lubrication system as claimed in claim 6, wherein the valve spool is biased by a spring and wherein a threshold pressure substantially less than the normal operating fluid pressure is required to overcome the force of the spring.

8. A method of distributing lubricant to a hydraulic or pneumatic tool having a bearing surface, comprising:
moving a valve spool of a valve between an open position in which drive fluid is provided to the tool and a closed position in which drive fluid is blocked by the valve and is not provided to the tool, and
applying a force to a piston formed integral with the valve spool when the valve spool moves between the open and closed positions to cause displacement by the piston of a lubricant from a lubricant charge chamber to the bearing surface of the tool.

9. A method as claimed in claim 8, wherein the valve spool is moved from the closed position to the open position to displace the lubricant from the lubricant charge chamber.

10. A method as claimed in claim 9, wherein the valve is located in a flow path between a hydraulic or pneumatic fluid supply and the tool, and the method includes applying drive fluid to the valve at or below a normal operating pressure of the tool to open the valve by movement of the valve spool.

11. A method as claimed in claim 8, further comprising moving the valve spool between the open and closed positions to cause further lubricant to enter the lubricant charge chamber to replenish the lubricant charge chamber.

12. A method as claimed in claim 8, wherein the valve is located in a flow path between a hydraulic or pneumatic fluid supply and the tool, and the method includes applying drive fluid to the valve at or below a normal operating pressure of the tool to open the valve by movement of the valve spool.

13. A method of distributing lubricant to components of a hydraulic or pneumatic tool comprising:
supplying a drive fluid for powering a tool to an inlet aperture of a valve, the valve in a closed position preventing the drive fluid from flowing through the valve to the tool;
increasing the pressure of the drive fluid at the inlet aperture until the pressure of the drive fluid at the inlet aperture causes the valve to move to an open position;
when the valve moves from the closed position to the open position, using a lubricant pumping mechanism formed integral with the valve to apply a force to a lubricant in a lubricant charge chamber which pressurizes the lubricant to pump the lubricant to a component of the tool to lubricate the component; and
when the valve moves to the open position, passing the drive fluid through the valve to the tool to drive the motion of the tool.

14. A method according to claim 13 further comprising:
after increasing the pressure, subsequently decreasing the pressure of the drive fluid at the inlet aperture until the valve moves to its closed position, the valve being biased to its closed position by the force of a spring.

15. A method according to claim 14 wherein the movement of the valve to its closed position draws a lubricant into the lubricant charge chamber.

16. A tool comprising:
a first sleeve mounted to the tool having at least one hydraulic fluid inlet aperture in fluid communication with a pressurized fluid source for receiving a drive fluid from the pressurized fluid source and at least one hydraulic fluid outlet aperture in fluid communication with the tool for delivering the drive fluid to the tool;

a valve spool at least partially positioned within the first sleeve and adapted to move between a tool-deactivated position in which a fluid path for flow of the drive fluid between the hydraulic fluid inlet aperture and the hydraulic fluid outlet aperture is blocked by the valve spool and therefore closed, and a tool-activated position in which the fluid path between the hydraulic fluid inlet aperture and the hydraulic fluid outlet aperture is open and permits the drive fluid to flow from the hydraulic fluid inlet aperture to the hydraulic fluid outlet aperture;

a second sleeve mounted to the first sleeve and having passageways for conveying grease into the second sleeve and out of the second sleeve; and a pumping mechanism at least partially positioned within the second sleeve and integral with the valve spool, which pumps grease through the passageways and directs it to bearing surfaces on the tool.

17. A tool according to claim 16 wherein the valve spool includes the pumping mechanism and moves in unison therewith.

18. A tool according to claim 16 wherein the pressure of the drive fluid activates the pumping mechanism.

19. A tool according to claim 18 wherein the drive fluid flows into the at least one hydraulic fluid inlet aperture of the first sleeve and when the valve spool is in its tool-activated position the drive fluid acts on the pumping mechanism to activate it before the drive fluid exits the at least one hydraulic fluid outlet aperture.

20. A tool comprising:
a lubrication system housing attached to the tool having at least one cartridge supporting recess for receiving a grease cartridge;
at least one sleeve attached to the tool and abutting the housing;
a valve spool at least partially positioned in the at least one sleeve and configured to move between a first position in which a fluid path for flow of drive fluid to the tool is closed and a second position in which the fluid path is open;
a lubricant pumping mechanism housed at least partially inside the at least one sleeve and integral with the valve spool;
at least one grease inlet passageway formed in the lubrication system housing and the at least one sleeve and leading from the cartridge supporting recess to the lubricant pumping mechanism; and
at least one grease outlet passageway formed in the at least one sleeve and leading from the lubricant pumping mechanism to passageways formed in the tool leading to bearing points.

* * * * *